Nov. 24, 1931.  P. G. EDWARDS ET AL  1,832,969
TESTING SYSTEM
Original Filed Sept. 13, 1927
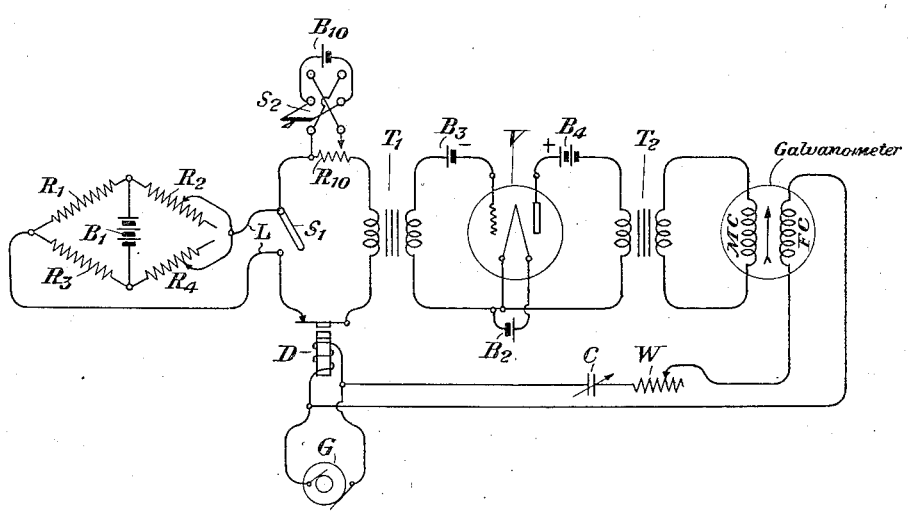
INVENTORS
P.G.Edwards and H.W.Herrington
BY
ATTORNEY Patented Nov. 24, 1931

1,832,969

UNITED STATES PATENT OFFICE

PAUL G. EDWARDS, OF BLOOMFIELD, AND HAROLD W. HERRINGTON, OF UPPER MONTCLAIR, NEW JERSEY, ASSIGNORS TO AMERICAN TELEPHONE AND TELEGRAPH COMPANY, A CORPORATION OF NEW YORK

TESTING SYSTEM

Original application filed September 13, 1927, Serial No. 219,339. Divided and this application filed June 28, 1928. Serial No. 288,922.

This invention relates to testing systems of great sensitivity employing galvanometers, voltmeters, or the like. More particularly, this invention relates to a system for determining the condition of unbalance of a Wheatstone bridge by interposing between a measuring instrument and one of the diagonals of the bridge an amplifying system, whereby the conditions of unbalance may be considerably magnified so that a more accurate and more sensitive degree of balance may be obtained.

This is a division of applicants' copending application, Serial Number 219,339, filed September 13, 1927.

Apparatus will be described herein comprising primarily a vacuum tube system associated with galvanometer in a novel combination. Obviously, one or more stages of amplification may be employed in the vacuum tube system, as desired. The vacuum tube system of this invention is connected to a galvanometer which is so arranged that no deflection is obtained thereon when no current is impressed on the vacuum tube system, any deflection, however, being proportional to the magnitude of the impressed current.

It is one of the objects of this invention to provide a testing system of great sensitivity and high accuracy comprising a galvanometer or voltmeter or the like, and a vacuum tube system for increasing the magnitude of the current or voltage to be tested.

It is another object of this invention to provide a testing system which will include a galvanometer and a neutralizing circuit for neutralizing the effect of stray or residual currents impressed upon the system, which currents may interfere with the accurate determination of the electrical characteristic of a source which is being tested.

Other objects and features of the invention will be better understood from the detailed description hereinafter following, when read in connection with the accompanying drawing, in which there is shown a testing system including a galvanometer having a moving coil and a fixed coil in inductive relationship, the moving coil being coupled through a vacuum tube system to a source of current to be tested, while the field coil is coupled to a source of alternating current of definite frequency.

Referring to the drawing, there is shown a Wheatstone bridge system comprising four arms, $R_1$, $R_2$, $R_3$ and $R_4$. One diagonal of the bridge includes a source of potential $B_1$, and the other diagonal of the bridge is connected to testing apparatus to be described hereinafter. Arms $R_2$ and $R_4$ of this bridge may preferably be resistances which are adjustable in magnitude. It will be obvious that while a particular Wheatstone bridge system has been shown herein merely for illustrative purposes, any other Wheatstone bridge system involving elements of reactance or inductance, etc., may be employed instead thereof, without departing from the scope of the invention. A switch $S_1$ is shown in its open position which, if closed, provides a short-circuit for the diagonal of the bridge connected to the testing system so that currents in that diagonal of the bridge will then be substantially ineffective upon the testing system.

A vacuum tube system comprising a three-element vacuum tube V, including a grid electrode, a filament and a plate electrode, has an input circuit connected between the grid electrode and the filament, and an output circuit connected between the plate electrode and the filament. The filament is heated to an electron-emitting temperature by a battery $B_2$. A battery $B_3$ provides the necessary bias for the grid electrode of the vacuum tube V in order that the tube may be employed as an amplifier. The secondary winding of a transformer $T_1$ is shown connecting the positive terminal of battery $B_3$ and the filament of the vacuum tube V. When switch $S_1$ is open, the primary winding of transformer $T_1$ bridges the diagonal of the Wheatstone bridge through a resistance $R_{10}$ and through the armature of a relay D. Reference character $B_4$ designates the plate battery for the output circuit of the vacuum tube V.

This arrangement shows the leads L connected in a circuit with the resistance $R_{10}$, the primary winding of transformer $T_1$ and the armature of relay D. The switch $S_1$, when closed, provides a short circuit for the currents flowing over leads L in order to minimize the effect of these currents on the rest of the system. The winding of relay D is connected to a source of alternating current G of any frequency, preferably a low frequency of, for example, 135 cycles. A battery $B_{10}$ is related to resistance $R_{10}$ so that its total voltage or any part thereof may be applied to the system. A double-throw reversing switch $S_2$ interconnects battery $B_{10}$ and resistance $R_{10}$. Battery $B_{10}$ is connected to the center terminals of switch $S_2$. The magnitude of the fraction of the potential of battery $B_{10}$ to be applied to the circuit in series with the resistance $R_{10}$ may be controlled by the arm associated with resistance $R_{10}$. Thus, by increasing the magnitude between the movable terminal associated with resistance $R_{10}$ and its fixed terminal, the fraction of the voltage of battery $B_{10}$ to be applied to the circuit in series with resistance $R_{10}$ will be increased, and vice versa. Moreover, the arm of switch $S_2$ may be thrown from one side to the other in order to reverse the polarity of the applied voltage, as desired.

It is a well-established fact that thermal effects or residual electromotive forces or the like may be present in the circuit connected to the primary winding of transformer $T_1$. In order to provide a testing system of great sensitivity and of high efficiency, it is necessary to balance the system with respect to the galvanometer against these thermal effects or residual electromotive forces. Accordingly, the armature of relay D is allowed to interrupt the circuit of the primary winding of transformer $T_1$ while switch $S_1$ is kept in its closed position. Accordingly, pulsations of, for example, 135 cycles may be applied to the primary winding of transformer $T_1$ and these pulsations will become induced in the secondary winding of that transformer. Consequently, the needle of the galvanometer will provide an indication of the magnitude of these interfering currents or voltages. In order to eliminate the effect of these currents or voltages on the testing system with respect to the galvanometer, switch $S_2$ and resistance $R_{10}$ may be manipulated so that the effective potential and polarity of battery $B_{10}$ may be changed as found necessary. Of course, the effective polarity of battery $B_{10}$ may be made positive or negative by throwing switch $S_2$ upwardly or downwardly, and the effective potential of that battery to be applied may be increased or decreased by the manipulation of the arm associated with resistance $R_{10}$. By making these adjustments, a condition will finally be reached when the testing system, particularly that part of it relating to the galvanometer, will be substantially independent of stray or residual currents introduced by thermocouples or the like.

To detect the presence of a current or voltage in leads L, switch $S_1$ is opened. At the same time interruptions are established by the armature of relay D, the winding of that relay being connected to generator G. Accordingly, current of a definite frequency, i. e., the frequency of generator G, is impressed between the grid electrode and filament of vacuum tube V, the amplitude of this current depending upon the magnitude of the current flowing over leads L. With regard to the Wheatstone bridge, the magnitude of the current flowing between the grid electrode and filament of vacuum tube V will correspond to the degree of unbalance in the bridge. A deflection of the galvanometer needle will become apparent in proportion to the magnitude of the current at L, and in the example of the Wheatstone bridge arrangement, adjustments may be made until a balanced condition is obtained, whereupon the needle of the galvanometer will move to its zero or undeflected position. Transformer $T_1$ may preferably be shielded and tuned to the period of interruption of the relay. Thus, transformer $T_1$ may have its greatest efficiency at current of the frequency of generator G. If transformer $T_1$ is so tuned, it will have a high amplification constant, the amplification constant depending in some measure on the ratio of turns on the secondary and primary windings. Obviously, also, any number of stages of amplification may be included in the system within the scope of the invention.

Transformer $T_2$ couples the output circuit of the vacuum tube V to the moving coil MC of the galvanometer, the field coil FC of which may be connected to the source of alternating current G through a circuit involving either inductance and capacity of variable magnitudes or both. The galvanometer is illustrated and fully described in applicants' copending application filed May 5, 1926, Serial No. 106,992.

The moving coil MC and the field coil FC of the galvanometer are in inductive relationship. The current flowing through the field coil from the source G may be brought into any desired phase relationship with the current flowing through the moving coil MC by varying the magnitude of the capacity of condenser C or the magnitude of the inductance of winding W, or both. Moreover, when no current flows in the moving coil MC, the needle of the galvanometer is not deflected.

To balance the system against the interfering effects of stray or residual currents, switch $S_1$ is closed, switch $S_2$ is moved upwardly or downwardly, and the magnitude of the potential of battery $B_{10}$ to be applied to the circuit in series with the primary winding of transformer $T_1$ is manipulated by the arm associated with resistance $R_{10}$. Accordingly, the effect of these stray or residual currents may be substantially neutralized. Switch $S_1$ may then be opened and the presence of any current in leads L may be indicated by deflection of the needle of the galvanometer.

It will be obvious that while the field coil of the galvanometer is shown connected to the same source of current, i. e., source G, which source provides the current flowing in the circuit in series with the primary winding of the transformer $T_1$, a separate source of current may be employed, if desired, which also may be of the same frequency or of a different frequency, within the scope of the invention.

While this invention has been shown in certain particular embodiments merely for the purpose of illustration, the principles of this invention may be applied to other and widely varied organizations without departing from the spirit of the invention or the scope of the appended claims.

What is claimed is:

1. The combination of a Wheatstone bridge having a balancing diagonal, a vacuum tube system, a galvonometer having a field coil and a moving coil, a relay having its winding energized by alternating current of definite frequency and its armature in series with the balancing diagonal of said Wheatstone bridge, said vacuum tube system amplifying currents flowing in the balancing diagonal of the Wheatstone bridge and impressing these currents on the moving coil of said galvanometer and providing indications upon said galvanometer corresponding to the degree of unbalance of the said Wheatstone bridge.

2. The combination of a transformer, a galvanometer having a moving coil and a fixed coil in inductive relationship, said moving coil being coupled to the secondary winding of said transformer, a relay, and a source of alternating current energizing the winding of said relay, said source of alternating current similarly energizing the field coil of said galvanometer, the armature of said relay being connected in series relationship with the primary winding of said transformer.

3. The combination of a source of direct current to be tested, a transformer, a galvanometer system having a moving coil and a fixed coil in inductive relationship, a relay, a source of alternating current of definite frequency which energizes the winding of said relay as well as the field coil of said galvanometer system, the moving coil of said galvanometer system being coupled to the secondary winding of said transformer, the primary winding of said transformer being connected in series with the armature of said relay and the source of direct current to be tested.

4. The combination of a vacuum tube amplifying system, a galvanometer system having a field coil and a moving coil in inductive relationship, a source of alternating current, a relay, the winding of said relay and the field coil of said galvanometer system being energized by current from said alternating current source, and a Wheatstone bridge, one diagonal of which is connected in series with the armature of said relay, the vacuum tube amplifying system interconnecting the circuit including the armature of said relay and the diagonal of said Wheatstone bridge with the moving coil of said galvanometer system.

5. The combination of a galvanometer having a moving coil and a fixed coil in inductive relationship, a Wheatstone bridge, a vacuum tube system to amplify the currents in a diagonal of said bridge before their application to the moving coil of said galvanometer, a relay having an armature connected to the diagonal of said bridge related to the vacuum tube system, a source of alternating current to be employed for the energization of the winding of said relay and for the energization of the field coil of said galvanometer, a tuned circuit interconnecting the field coil of the galvanometer and the source of alternating current in order to bring about any desired phase variation between the current in the field coil of the galvanometer and that in the moving coil in compensation of the phase variation brought about by the vacuum tube system.

6. The combination of a galvanometer system having a field coil and a moving coil in inductive relationship, a relay, a source of alternating current of definite frequency to energize the windings of said relay and the field coil of said galvanometer system, a Wheatstone bridge having a diagonal to be coupled to said galvanometer in order that a balanced condition may be produced in said bridge, the armature of said relay being related to the diagonal coupled to said galvanometer, and means for neutralizing the effests of stray and residual potentials upon said galvanometer system.

In testimony whereof, we have signed our names to this specification this 26th day of June, 1928.

PAUL G. EDWARDS.
HAROLD W. HERRINGTON.